US009639860B2

(12) United States Patent
Bramley et al.

(10) Patent No.: US 9,639,860 B2
(45) Date of Patent: *May 2, 2017

(54) METHOD OF ENABLING A USER TO INTERACT WITH CONTENT RECEIVED FROM A REMOTE SERVER

(71) Applicant: CRITICAL PATH DATA CENTRE LIMITED, Cheshire (GB)

(72) Inventors: Lei Bramley, London (GB); Russell Bulmer, London (GB); Andrew Tiller, London (GB); Neil Pepper, London (GB); Graham French, London (GB); Owen Day, London (GB)

(*) Notice: Subject to any disclaimer, the term of this patent is extended or adjusted under 35 U.S.C. 154(b) by 148 days.

This patent is subject to a terminal disclaimer.

(21) Appl. No.: 14/696,804

(22) Filed: Apr. 27, 2015

(65) Prior Publication Data
US 2015/0242904 A1 Aug. 27, 2015

Related U.S. Application Data

(63) Continuation of application No. 12/526,396, filed as application No. PCT/GB2008/050087 on Feb. 11, 2008, now Pat. No. 9,021,060.

(30) Foreign Application Priority Data

Feb. 9, 2007 (GB) .................................. 0702591.9

(51) Int. Cl.
*G06F 15/16* (2006.01)
*G06Q 30/02* (2012.01)
(Continued)

(52) U.S. Cl.
CPC ......... *G06Q 30/0267* (2013.01); *G06Q 30/02* (2013.01); *G06Q 30/0246* (2013.01);
(Continued)

(58) Field of Classification Search
CPC H04L 29/08072; H04L 29/06; H04L 29/0809
(Continued)

(56) References Cited

U.S. PATENT DOCUMENTS 7,143,241 B2  11/2006  Hull
7,429,973 B2   9/2008  Ota et al.
(Continued)

FOREIGN PATENT DOCUMENTS

WO  2005/025252  3/2005

OTHER PUBLICATIONS

International Search Report, dated Jul. 21, 2008, issued in priority International Application No. PCT/GB2008/050087.
(Continued)

*Primary Examiner* — Alan S Chou
(74) *Attorney, Agent, or Firm* — Synchronoss Technologies, Inc.; Frederick W. Dour (57) ABSTRACT

A user interacts with content received from a remote server; content (e.g. feeds from social networking sites, advertisements) is received over a wireless network at a mobile telephone, which then automatically displays a specific item of the content on the mobile telephone, without the user explicitly requesting the display of that specific item of content. In response to the user selecting or highlighting the displayed specific item of content, the mobile telephone lists multiple options that, if individually selected, each initiate an associated action that corresponds to a particular way of responding to or interacting with the specific item of content.

24 Claims, 4 Drawing Sheets (51) Int. Cl.
*H04M 1/725* (2006.01)
*H04M 3/487* (2006.01)
(52) U.S. Cl.
CPC ..... *G06Q 30/0254* (2013.01); *G06Q 30/0255* (2013.01); *G06Q 30/0272* (2013.01); *H04M 1/72544* (2013.01); *H04M 1/72561* (2013.01); *H04M 1/72583* (2013.01); *H04M 3/4878* (2013.01)
(58) Field of Classification Search
USPC ........................................................ 709/219
See application file for complete search history.

(56) References Cited

U.S. PATENT DOCUMENTS

| 7,464,110 | B2 | 12/2008 | Pyhalammi et al. |
| 7,668,538 | B2 | 2/2010 | Rosenberg et al. |
| 7,769,767 | B2 | 8/2010 | Petersen |
| 7,769,805 | B1 | 8/2010 | Barnes et al. |
| 2003/0135586 | A1 | 7/2003 | Minborg et al. |
| 2003/0142039 | A1 | 7/2003 | Minear et al. |
| 2005/0131837 | A1 | 6/2005 | Sanctis et al. |
| 2007/0026852 | A1 | 2/2007 | Logan et al. |
| 2007/0276863 | A1 | 11/2007 | Shenfield |
| 2008/0109528 | A1 | 5/2008 | Knight et al. |

OTHER PUBLICATIONS

Anonymous: "ShoZu Announces Innovative Mobile Advertising Platform Driven by its Direct-to-Handset Content Delivery Service Provides Highly Targeted Experiences with Rich Media Options & User-Friendly Interface," Internet Article, [Online] Jan. 7, 2007 (Jan. 7, 2007), XP002485004, Retrieved from the Internet: URL:http://www.shozu.com/AboutUs/pr_08jan07.html> [retrieved on Aug. 7, 2009].

QuickTime™ and a
TIFF (Uncompressed) decompressor
are needed to see this picture.

METHOD OF ENABLING A USER TO INTERACT WITH CONTENT RECEIVED FROM A REMOTE SERVER

CROSS REFERENCE TO RELATED APPLICATIONS

This application is a continuation of U.S. application Ser. No. 12/526,396, filed on Dec. 7, 2009, which claims the priority of PCT/GB2008/050087, filed on Feb. 11, 2008, which claims priority to Great Britain (GB) Application No. 0702591.9, filed Feb. 9, 2007, the entire contents of each of which are hereby incorporated in total by reference.

BACKGROUND OF THE INVENTION

1. Field of the Invention

This invention relates to a method of enabling a user to interact with content received from a remote server. The content is displayed on a mobile telephone. Typical forms of content include feeds from sites such as news or entertainment sites and also advertisement content.

2. Description of the Prior Art

It is becoming increasingly common to show advertisements on a mobile telephone. The typical approach, exemplified by the AdMob service, is for a publisher of a mobile web site (e.g. a WAP site) to add some lines of AdMob code to their web site. An advertiser then creates an advert, sends that advert to a central AdMob server and then bids on that server to have it included on selected mobile web sites. The server analyses bids and sends adverts that have the highest bids to the appropriate mobile web sites, so that those adverts are displayed on mobile telephones when users view those web sites with a browser. When a user clicks on an advert on a mobile web site, the advertiser pays both AdMob and the owner of the mobile web site. Advertising systems such as this have an important role to play because they (i) can encourage people to create new mobile web sites and (ii) enable mobile users to locate products and services of interest.

One limitation of this typical approach is that it works only with mobile web sites (e.g. WAP sites)—i.e. sites that are seen and interacted with using a browser application running on the mobile telephone. Although browsers are commonplace, the experience of interacting with mobile web sites using a browser can be poor. Also, adverts may not be relevant to an end-user and hence may be irritating. Conversely, if adverts that are genuinely useful to end-users could be displayed on a mobile telephone at the right time, then it is likely that click-through rates would be relatively high, given the closer relationship many users have with their mobile telephones, compared with their desktop PCs. But there has been no mechanism for achieving this.

Further, mobile telephones and PDAs are becoming increasingly powerful and able to run multiple local applications (e.g. Java applications) very quickly; these make WAP sites appear very cumbersome. But to date, there has been no viable and effective way of displaying advertising on these local applications.

Another feature of the conventional WAP based model advertising model (i.e. where a WAP browser on a mobile telephone displays an advertisement) is that the user is generally given just one way of interacting with the advertisement, namely to click on a WAP page to select another WAP page. Limited possibilities of interaction are common in mobile telephones, largely because their small screen size makes them very different from desktop PCs: with a desktop PC, the screen is large enough to enable complex menu systems to be displayed, often with multiple icons open at any one time, each selectable to open an application or initiate some function. But small screen devices like mobile telephones, none of that is possible; interaction is hence very much more constrained and lessons learned in the PC domain rarely translate fully into the different world of the small screen mobile telephone.

SUMMARY OF THE PRESENT INVENTION

The invention enables a user to interact with content received from a remote server. It comprises the steps of:

(a) receiving the content over a wireless network at a mobile telephone and then automatically displaying a specific item of the content on the mobile telephone, without the user explicitly requesting the display of that specific item of content;

(b) in response to the user selecting or highlighting the displayed specific item of content, listing multiple options that, if individually selected, each initiate an associated action that corresponds to a particular way of responding to or interacting with the specific item of content.

This is much richer and more flexible way of interacting with this kind of content. The content can, for example include an advertisement, which could be displayed as a banner or some other format that occupies only a part of the screen. The content may include a feed from a web site or other remote server.

In an implementation, a client application is installed onto the mobile telephone, the client application managing the download and storage of content from a remote server onto a memory (e.g. a cache memory) in the telephone and the presentation of any such content on the telephone. The content stored on the (cache) memory can be dynamically updateable over the air. The client application on the telephone automatically provides appropriate advertising content for one or more end-user applications to display, so that a specific end-user application automatically displays advertising content that is appropriate for it. This feature is described in more detail on Appendix 1.

Other Implementation Features

The specific items of content can be targeted for a user based on metadata in those specific items of content. The metadata can relate to advertising categories; the language of the user; the location of the user; the demographic of the user; the useage patterns of the user; and/or the feeds subscribed to by the user.

In operation, if the user highlights or selects a specific item of content, then that item will change its appearance and the available menu options will alter to include menu items for the applicable actions.

The applicable actions include any or all of the following: to display a full-screen advertisement for a configurable time period, or until the user clicks; to play an audio file; to play a video file in full-screen mode; to open a URL link in the phone's browser; to request more information via email; to send an email from a remote server to a pre-defined address; to dial a phone number; to send a pre-defined Web link to a friend via email from a remote server; to subscribe to a feed. To add a web site to the web sites used by the application that displays the content; to navigate to a specific screen in the menu system of the mobile telephone; to send a SMS or MMS message (the SMS or MMS message could for example subscribe the user to a premium SMS service).

The actions stored on the mobile telephone can be added to with new actions with an over the air update process. Each action can have a configurable menu label. Clicking or otherwise selecting an item of content will typically initiate one of the available actions. The content could be a banner advertisement and clicking on that banner causes a full-screen advert to be displayed, which after a predefined time then reverts to the view showing the banner advert highlighted and the available actions are selectable via menu buttons. The content could also be displayed in full-screen view and a specified key on the phone keypad then triggers a specific action.

A remote service may provide a feed of previews of content and the associated action, if selected, causes the mobile telephone to access a web or WAP site to purchase the full version of the previewed content.

Each specific item of advertisement content will have associated metadata comprising at least the following: Name/ID of advertiser; reference number for the specific advertisement; graphics; specification of which views the advertisement can be displayed in. Each specific item of advertisement content may also have associated metadata associated with each available action. The metadata associated with the action includes any of: a full screen advertisement file attachment; an audio file attachment (with optional graphic to display while the advertisement is playing); a video file attachment; a phone number and message text for click-to-call; URL links (for display in phone browser, or for sending to a friend via SMS/email); a pre-formatted SMS message and recipient phone number; pre-defined message templates and email addresses to which a server should send pre-formatted or user-generated messages; an associated subscription to a feed; the default time interval after which the highlighted banner advertisement will display a potential action; menu text labels for each call to action item; a specified order for the actions in the menu.

Each specific item of content may also have targeting metadata, which enables the content that is displayed to be targeted to a specific user.

Another feature is that when users view advertisements or initiate actions can be recorded, and this information can then be replicated back to a remote server for analysis. For each action initiated, one or more of the following information is recorded:

The type of action initiated;
The date and time when the action was initiated;
Whether initiating the action was user-generated or involuntary;
Context.

Another aspect is a mobile telephone adapted to enable a user to interact with content received from a remote server, in which the mobile telephone:

(a) receives the content over a wireless network at a mobile telephone and then automatically displays a specific item of the content on the mobile telephone, without the user explicitly requesting the display of that specific item of content;

(b) in response to the user selecting or highlighting the displayed specific item of content, the mobile telephone lists multiple options that, if individually selected, each initiate an associated action that corresponds to a particular way of responding to or interacting with the specific item of content.

Final aspects are computer software that, when running on a mobile telephone, enables the mobile telephone to perform the method defined above or that, when running on a mobile telephone, transforms the mobile telephone to a mobile telephone as defined above.

BRIEF DESCRIPTION OF THE DRAWINGS

The invention is described with reference to the accompanying drawings in which.

DETAILED DESCRIPTION

The present invention is implemented in a system called the ShoZu Mobile Advertising System. The invention specifically relates to a feature that we refer to in this document as 'Calls to Action'. A call to action is a possible way of interacting with content. The content has been sent to the device over the wireless network in background and is then automatically displayed by the device. An example of a call to action would be to play a video file, or to open a URL, or to dial a phone number.

Content can include advertisements, or feeds such as news or music (the user will typically have subscribed to a specific feed, but does not explicitly request any specific item of content on that feed). Hence, the user does not explicitly trigger the display of a specific item of content.

Implementations of the present invention gain power by being able to offer a large number of content appropriate actions. For example, where the specific item of content is an advertisement for a film at the cinema, then typical calls to action offered by the mobile telephone menu system could include all of the following: play a short preview of the film; share the preview with a friend; open a voice call to the local cinema; open a web page with screening times for eth film at the local cinema.

Further, the types of actions offered by a mobile telephone can be extended over the air, so as new ways of interacting with content are thought up, or the needs or behaviours of a user alters, they can be deployed on mobile telephones already in use.

Calls to action can be implemented in a photo-sharing application, running on a mobile telephone, called ShoZu. ShoZu allows users to easily and efficiently upload digital photographs taken on a mobile telephone to a remote server using a feature called Share-It. The remote server enables storage and sharing of digital photographs across a community. The ShoZu client application is loaded onto a mobile telephone (or it may be pre-installed) and then allows simple, one-click uploading of photos, video clips and text commentary to various destinations.

More on Share-It

ShoZu Share-It is a mobile telephone-to-Web media publishing service. It is pre-installed or available for download onto mobile telephones. Share-It offers very fast, one-click uploads of photos and video clips from the phone to the Web, enabling the rapid distribution of user-generated content created on camera phones to social networking sites, photo/video sharing sites, personal blogging sites, and citizen-contributed photojournalism sites. Because uploads take place in the background, users are free to make phone calls or take more photos during the image transfer process. Users can also add descriptions and tags to individual images from the phone before or after uploading, exchange two-way commenting and messages between the mobile telephone and the Web, and automatically attach location tags when GPS-enabled handsets are used. Users can also upload to any FTP or email address, including digital photo frames.

The data replication technology used in Share-it is more fully described in WO 2004/057828, the contents of which are incorporated by reference.

This data replication technology is also used to replicate content from feeds (such as photostreams, photographs, music, news) from third party sources (such as Flickr, CNN, Sky News, WIRED) that the user selects and subscribes to. The ShoZu implementation of a content feed to the mobile telephone is called ZuCast.

More on ZuCast

The ShoZu ZuCast service enables photos, video clips and other content to be delivered directly to the mobile telephone on a regular basis by subscription without any manual intervention or download downtime. Personal content feeds from social media sites can be set up. New content posted by designated friends on social media sites can then be sent automatically to ShoZu-enabled mobile telephones.

The data replication technology used in ShoZu Share-It and ShoZu ZuCast is also used to replicate advertisements onto a local cache or memory store on a mobile telephone from a remote server that stores many advertisements.

The system used to do this is called the Advertising Middleware System and is described in more detail in Appendix 1.

Brief Overview of the Advertising Middleware System

The Advertising Middleware System provides for the telephone itself to obtain or be supplied advertising content from a remote server and to locally store that advertising content in a cache on the telephone. This advertising content is then automatically shown in association with a running, in use (e.g. in foreground) application that generates a screen that an end-user interacts with ('an end-user application'). The content could include text, images, sound and multimedia content. The content is shown 'automatically' in the sense that the advertising content is displayed without the end-user explicitly requesting any specific item of content, (although he may opt-in to the general approach of having advertising content displayed on his mobile telephone). The advertising content may be shown at the same time as content generated by the application itself (e.g. as a banner advertisement in a small window underneath the display generated by the application) or there may be short breaks away from the application itself during which the advertising content is shown.

The telephone itself then determines which adverts etc. it should display, depending on which application is currently being used (i.e. is currently displayed on screen). It should be noted that in some mobile telephones, it is possible to have several applications concurrently in use and being displayed/controlling screen estate, e.g. each within their own window, or running in different areas of the screen; each application could be associated with different advertising content.

By enabling the telephone itself to automatically display locally stored advertising content etc., depending on the particular application being used, it is possible to have advertising content displayed in different end-user applications running locally on the telephone. These end-user applications will typically operate far more rapidly than WAP based sites, with their associated high latency links. The Advertising Middleware System hence enables advertising content that is context appropriate to be rapidly retrieved and included within many of these end-user applications, each running on a mobile telephone.

In the following section, the advertisements are banner advertisements shown in the ShoZu application (i.e. there is no specific customisation of the advertisements across multiple applications because we are dealing now with just a single application).

Key Features of the ShoZu Mobile Advertising System

ShoZu creates an advertising framework, into which third parties can insert ads.

The key features are:

Engaging Advertisement Presentation
    ShoZu engagingly presents advertisements on the phone, in an appropriate context, without interrupting user journeys.

Flexible/Configurable Calls to Action
    Many types of direct response calls to action can be attached to advertisements, including click-to-call, open WAP site, send SMS, download file, subscribe to ZuCast.

Non-Intrusive Advertisement Delivery
    With ShoZu, advertisements on the phone can be dynamically updated over the air; updates are delivered non-intrusively in the background.

Powerful Targeting
    Targeting of advertisements can initially be based on a feed such as ZuCasts (see above) that is subscribed to (e.g. advertisements for music downloads can be included in music-related ZuCasts), but ultimately can be much more sophisticated (e.g. targeting by location, demographic, phone usage patterns. . . ).

Detailed Response Tracking
    ShoZu can record a wide range of advertisement view and response metrics, and feed this information back to the ShoZu server for analysis. This allows advertisers to accurately measure the success of a campaign.

ShoZu Mobile Advertising System: Requirements

ShoZu Banner Advertisements

ShoZu Banner advertisements are included within the ShoZu advertisement catalogue (i.e. the local cache of advertisements stored locally on the mobile telephone; for more details, see Appendix 1), allowing them to be dynamically updated OTA. Banner advertisements appear in ShoZu (two-line) list views, and offer configurable calls to action when highlighted. User responses are tracked in the ShoZu database.

Embedded Sponsorship Advertisements

Sponsorship advertisements are embedded within the ZuCast items themselves. For example:
    Watermark on a ZuCast photo item.
    Video advertisement header (or footer) in a ZuCast video item.
    Flash overlay advertisement within a ZuCast video item.
    Slideshow advertisements as a visual backdrop to an audio podcast.

Advertisement Presentation on the Client

ShoZu will be able to display Banner advertisements in one or more of the following list views:
    ShoZu main view.
    Share-It main view.
    ZuCasts main view.
    ZuCast channel view.

More generally, advertisements can be targeted to appear in any pre-defined screens within the user interface.

If present, a Banner advertisement should always be visible when the user opens the relevant ShoZu view (i.e. the advertisement slot must always be one of the first three items displayed so that it is not scrolled off the bottom of the screen when the view is opened). This helps with tracking, as it makes certain that the advertisement has been displayed to the user when the view is opened. There will only be one slot available for advertisements in any given ShoZu view.

Highlighting a Banner advertisement will make the banner graphic change, and will alter the menu options to include various calls to action (see 0 below). If more than one Banner advertisement is available for a particular list view, advertisements will be selected in rotation for display each time the user opens the relevant view.

If no Banner advertisements are available for a particular list view, then the items below will shuffle up to close the space. An advertisement may have an associated expiry date after which it will not be displayed.

For each advertisement campaign, a single set of graphical assets (optimised for QVGA devices) will be used for all handset platforms. For future use (when we can transcode ZuCasts and advertisements to create optimized versions for different phones), we should incorporate a mechanism for the client to inform the server about the display capabilities of the device on activation (screen resolution, default screen orientation, preferred video format). The screen resolution and orientation will be used in future to determine the appropriate resolution of advertisements to be sent to client. The video format will be used to determine which video ZuCasts to send to client.

Placing a Banner advertisement in the Share-It main view will bump Comments off the bottom of the main Share-It screen on some phones. It would therefore be desirable to include an alert for new comments feature.

Calls to Action

Banner advertisements will support the following calls to action:

Display a full-screen advertisement (for a configurable time period, or until the user clicks).

Play an audio file (and optionally display a full-screen image at the same time).

Play a video file (in full-screen mode).

Open a URL link in the phone's browser.

Request more information via email (if ShoZu does not yet know the user's email address, the user will be prompted to provide it).

Send an email (from the ShoZu server) to a pre-defined address (e.g. this could be used for a competition entry).

Dial a phone number (i.e. click-to-call).

Send a pre-defined Web link to a friend via email (from the ShoZu server).

Subscribe to a ZuCast.

Each call to action will have a configurable menu label (i.e. for a given call to action, the menu label can be different in each banner advertisement).

A Banner advertisement will be able to support any number (including none) of the above calls to action as menu options when the advertisement is highlighted.

Figure 4A:
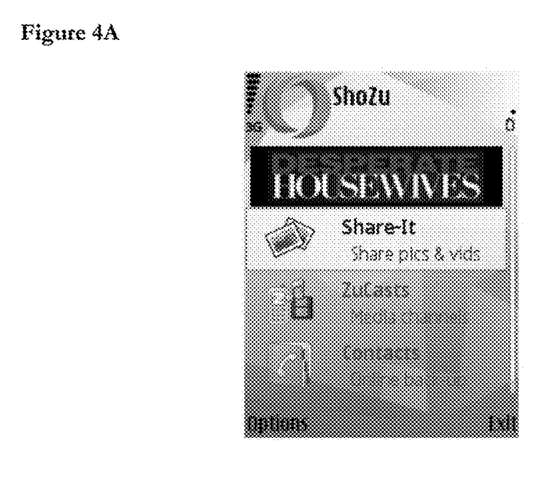
FIGS. 4a-to 4d includes screenshots from a mobile telephone that implements the present invention.
Figure 4B:
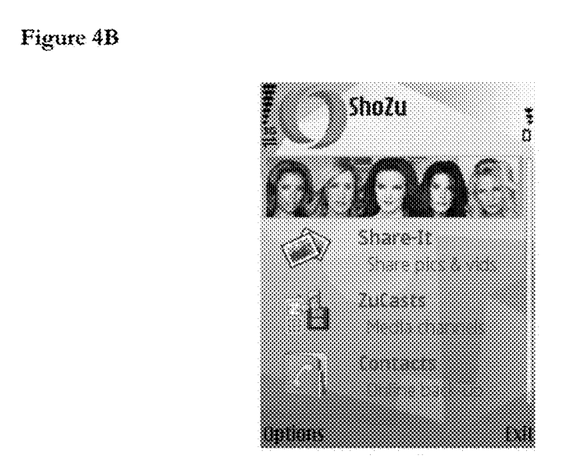
Figure 4C:
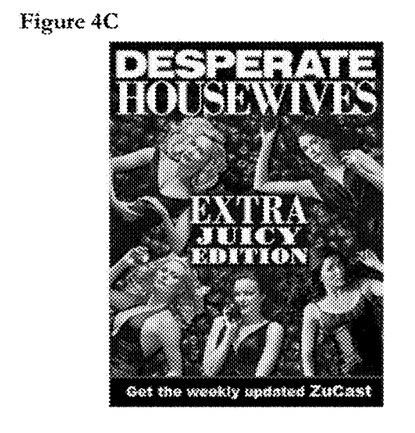
Figure 4D:
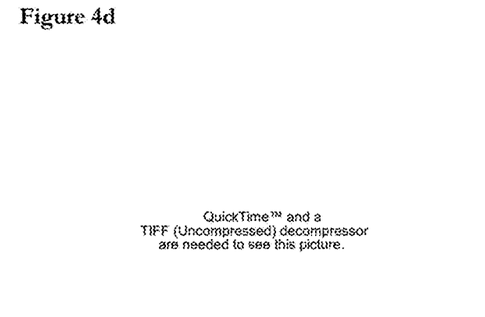

For example, FIG. 4A depicts the ShoZu main view, showing a banner advert for the TV show 'Desperate Housewives'. The two main ShoZu functions, Share-It and ZuCasts are shown below the banner advert. Selecting the banner advert (e.g. scrolling to it) causes the advert to change, as shown in FIG. 4B. Clicking on the Desperate Housewives banner advert of FIG. 4B causes a full-screen advert to be displayed, as shown in FIG. 4C; nothing else is shown on the screen. Hence, clicking a Banner advertisement will initiate one of the available calls to action (we will refer to this as the "primary banner call to action"). If this particular call to action displays a separate view (e.g. a full screen advertisement or video, as in FIG. 4C), then the user will be returned at the end of this view to the previous view with the Banner highlighted (i.e. all calls to action will be available in the menu on returning), as shown in FIG. 4D. In FIG. 4D, specific calls to action for this advert are now available from the menu system. In this case, these actions are to subscribe to a ZuCast feed about the show called 'behind closed doors'; next, to recommend this show (or the ZuCast) to a friend; and an item that will call up further calls to action ('More actions') at a deeper level of the menu hierarchy.

In a full-screen advertisement view (e.g. a full screen image or video), it will be possible to include one specified call to action via a specified key on the phone keypad (we will refer to this as the "full screen call to action"). For example, a message on a full-screen ad, or at the end of a video ad, could display "Press 1 to call for tickets". (Pressing any other key will return the user to the Banner-highlighted view.)

Leaving a Banner advertisement highlighted for more than a configurable number of seconds will have the same effect as clicking the advertisement (i.e. it will initiate one of the calls to action, after which the user will be returned to the Banner-highlighted view). This will happen only the first time the Banner is left highlighted (to avoid infinite loops).

Several of the calls to action require the user's email address to be correct. It would be desirable for this email address to be visible and editable from the client, rather than requiring the user to change this at the ShoZu web site.

The "subscribe to ZuCast" call to action can even be shown if the relevant ZuCast is not listed in the phone catalogue.

Metadata for Banner Advertisements

Each Banner advertisement will have associated metadata comprising a subset of the following list (mandatory metadata is marked with a *):

Name/ID of advertiser.*

Reference number for the specific ad.*

Expiry date.

Banner graphics (two different graphics required for highlighted and non-highlighted display).*

Specification of which views the advertisement can be displayed in—for example an advertisement might be displayed in all four views (see □ above), or only in selected ZuCasts.*

Call-to-action metadata:

Full screen advertisement file attachment (with specified time-out period).

Audio file attachment (with optional graphic to display while the advertisement is playing).

Video file attachment.

Phone number and message text for click-to-call.

URL links (for display in phone browser, or for sending to a friend via SMS/email).

Pre-formatted SMS message and recipient phone number (for future use).

Pre-defined message templates and email addresses to which ShoZu server should send pre-formatted or user-generated messages).

Associated ZuCast subscription.

Specification of the primary banner call to action (when user clicks the Banner advertisement—see [0058] above).

Specification of the full screen call to action (i.e. which call to action, if any, should be available from the full-screen advertisement display (see above), and which keypad key should be associated with this call to action).

The default time interval after which the highlighted Banner advertisement will initiate a call to action (see [0061] above) this interval may be specified as "never".

Menu text labels for each call to action item.

Specified order for the calls to action in the menu.

Targeting metadata:

ZuCast IDs (specifying which ZuCasts the advertisement can be displayed in).

Share-It partner IDs (specifying that the advertisement should be displayed to users who have these destinations configured).

ZuCast categories relevant for the ad.

Language (according to the phone language setting).

Demographic category label.

Target operator/carrier.

Target phone type/model.

Target country (i.e. where the user is currently located, as opposed to the user's home country).

Target keywords.

Location (with precision).

In order for the server to be able to target advertisements based on language in future, it would be desirable for the client to record the phone's language setting and send it to the server. This should happen on activation, and also when the language setting is changed by the user.

The ShoZu Advertisement Catalogue

The ShoZu server should maintain a master advertisement catalogue, containing all the available advertisements and their associated metadata (see Appendix 1).

Each ShoZu client will store its own advertisement catalogue containing the subset of the available advertisements appropriate to the specific user. It should be possible to dynamically update the advertisement catalogue from the server. If advertisements are added modified, or deleted from the master catalogue on the server, they will automatically be added, modified or deleted in the relevant advertisement catalogues on all ShoZu users' phones.

Expired advertisements should be automatically removed from the advertisement catalogue by the server (which will cause them to be deleted on clients when they next connect).

A default advertisement catalogue may be included in the ShoZu client at build time (e.g. we might use this for a ShoZu intro tour, and to promote some specific ZuCasts).

Targeting Advertisements

For phase 1, the ShoZu client will receive advertisements based on one or more of the following targeting criteria:

Which ZuCast(s) the user is subscribed to.

Which Share-It destination(s) the user has configured.

The country the user is (currently) in.

The user's phone model.

The user's (home) carrier network.

(In future, more complex targeting will be possible—see below).

Response Tracking

The ShoZu client will record when users view advertisements or respond to calls to action, and will replicate this information to the ShoZu server where it will be stored for analysis.

For each ShoZu Banner ad, the following information will be recorded:

The number of times the Banner advertisement is displayed in a view on the phone.

The number of times the Banner advertisement is highlighted on the phone.

For each call to action initiated, the following information will be recorded:

The type of call to action initiated (click-to-call, open WAP link . . . ).

The date and time when the call to action was initiated.

Whether the call to action was user-generated or involuntary.

Context (i.e. the specific ShoZu view/ZuCast that the Banner advertisement was displayed in when the call to action was initiated).

For Embedded Sponsorship advertisements, the following information will be recorded:

The number of times the advertisement was viewed.

It may be best to simply record the date and time of all ZuCast item views. Each ZuCast item will need a label so that items that include advertisements can be searched in the database.

Response tracking information should be replicated back to the ShoZu server whenever the client connects. Recording new response tracking information on the client should not in itself initiate a connection to the ShoZu server.

It will also be possible to report "zero usage" (e.g. an advertisement is delivered to a particular user's phone but is not viewed at all during the analysis period, or a particular user never executes a specific call-to-action). This reporting will be done directly from the database, based on which advertisements have been delivered to which users combined with the tracking data that comes back from the phone; this will be simplified if the tracking data is stored within the 'advert' object itself.

SQL queries and spreadsheet templates should be created for standard analysis of response tracking data from trial users.

Notes on Requirements for Future Phases

External Interfaces

As well as providing the advertising framework itself, in future we will also need to provide a number of external interfaces. For example, interfaces to popular ad-serving engines (e.g. AdMob) will give ZuCast partners an opportunity to share in advertising revenues without having to provide the advertisements themselves. We could offer a service to source and insert appropriate advertisements into the partner's ZuCasts, and share revenues appropriately with the ad-server and ZuCast partner. A web-based interface will be needed for direct advertising partners to register themselves with ShoZu and submit their advertising inventory, with appropriate metadata for targeting the advertisements appropriately to ShoZu users. We will also need business processes (e.g. to ensure advertisements contain appropriate content).

A web-based interface will be needed so that advertising partners can analyse the success of their own campaigns.

Access at appropriate levels should be made available to partners (e.g. advertisers should be able to track how well their particular advertisement campaigns are doing).

It should be possible for partners to view various levels of stats, including a high level overview, or to drill down to an individual advertisement or even an individual user.

In addition to ad-clicks, the stats should show the number of phones to which each advertisement has been distributed and the number of times each Banner advertisement has been displayed.

Our ZuCast authoring/feed management tools will need to include methods for a ZuCast partner to insert their own advertisements into their ZuCasts.

Revenue reconciliation systems will be needed so that ShoZu can invoice and pay partners appropriately.

Ultimately we may also need automated systems for advertisement pre-processing advertisement inventory (re-formatting, transcoding etc.).

Targeting Advertisements

In future, we will need more sophisticated mechanisms for targeting advertisements. The advertisement metadata defined for phase 1 includes provision for this.

Advertisements might be automatically associated with ZuCasts based on the subject matter of the ZuCast itself (e.g. based on the ZuCast category).

Advertisements in a particular language might be selected for a user based on the language setting of her phone.

ShoZu users might be assigned to particular demographic categories, and relevant advertisements could be selected on this basis.

We could also target advertisements based on the text users have entered in their ShoZu application (e.g. tags, titles, descriptions, comments), and on information about their interests gleaned from the ZuCasts they subscribe to.

Advertisements could be targeted based on the user's location, or places where the user is frequently located. We have already specified a project that could enable us to demonstrate this (see the requirements document, ShoZu location services). Here's the idea:

On GPS-enabled devices, ShoZu can record GPS coordinates and cell ID information for each photo or video captured, and send this information up to the ShoZu server. The ShoZu server would maintain a database of cell ID data uploaded by GPS-enabled phones, and store the most recent GPS coordinates associated with each cell ID. On non-GPS devices, ShoZu would record cell ID information and upload it as photo video metadata to the ShoZu server. The ShoZu server would look up the GPS coordinates associated with this cell ID in the server's location database. If these coordinates are available, the ShoZu server would select an appropriate advert from our inventory based on location.

The ShoZu Terms and Conditions will need to be updated to inform the user that their details may be used for targeting advertisements.

Advertisement Catalogue Updates

The frequency and content of advertisement catalogue updates should be defined by rules on a per-account basis.

The rules should be able to deliver targeted advertisements based on the targeting metadata.

The rules should determine an appropriate update frequency for the individual user based on demographic category and personal usage history. For example, for demographic category "E" (e.g. the lowest spending demographic), updates should not occur more often than once per week, and should not exceed a 2% "tax" on ShoZu data sent/received.

Possible Extensions

Allowing Sponsorship advertisements to include calls to action.

Supporting additional calls to action:

Send a pre-formatted SMS message to a pre-assigned number. (Note that the user will need some appropriate control. This mechanism might be used for a "Call me" feature, where the advertiser retrieves the user's phone number from the received SMS.)

Send a pre-defined WAP link to a friend via SMS (from the phone).

Play a slide show.

Play a Flash animation.

Open the ZuCast phone catalogue at a particular category.

Allow ZuCasts to include previews for downloadable content (with a menu option to click-to-buy the full content requires support for end-user billing).

For each view of a video advertisement, track the proportion of the video that is actually watched (and the same for audio advertisements).

Support multiple versions of the advertisement catalogue, with each catalogue optimized for specific phone types.

Weight advertisements for preferential display, rather than using a strict rotation system.

Appendix 1

Advertising Middleware System

The Advertising Middleware System provides for the telephone itself to obtain or be supplied advertising content from a remote server and to locally store that advertising content. This advertising content is then automatically shown in association with a running, in use (e.g. in foreground) application that generates a screen that an end-user interacts with ('an end-user application'). The content could include text, images, sound and multi-media content. The content is shown 'automatically' in the sense that the advertising content is displayed without the end-user explicitly requesting any specific item of content, (although he may opt-in to the general approach of having advertising content displayed on his mobile telephone). The advertising content may be shown at the same time as content generated by the application itself (e.g. in a small window underneath the display generated by the application) or there may be short breaks away from the application itself during which the advertising content is shown.

The telephone itself then determines which adverts etc. it should display, depending on which application is currently being used (i.e. is currently displayed on screen). It should be noted that in some mobile telephones, it is possible to have several applications concurrently in use and being displayed/controlling screen estate, e.g. each within their own window, or running in different areas of the screen; each application could be associated with different advertising content.

By enabling the telephone itself to automatically display locally stored advertising content etc., depending on the particular application being used, it is possible to have advertising content displayed in different end-user applications running locally on the telephone. These end-user applications will typically operate far more rapidly than WAP based sites, with their associated high latency links. The Advertising Middleware System hence enables advertising content that is context appropriate to be rapidly retrieved and included within many of these end-user applications, each running on a mobile telephone. This contribution is itself predicated on the mobile telephone itself including new components (albeit ones that may be implemented in software)—namely, in an implementation, (a) the client application that downloads the advertising content from a remote server and exposes a generic API accessible to many different end-user applications running on the telephone, enabling each to request/be sent appropriate advertising content and (b) the local store of advertising content.

Figure 1:
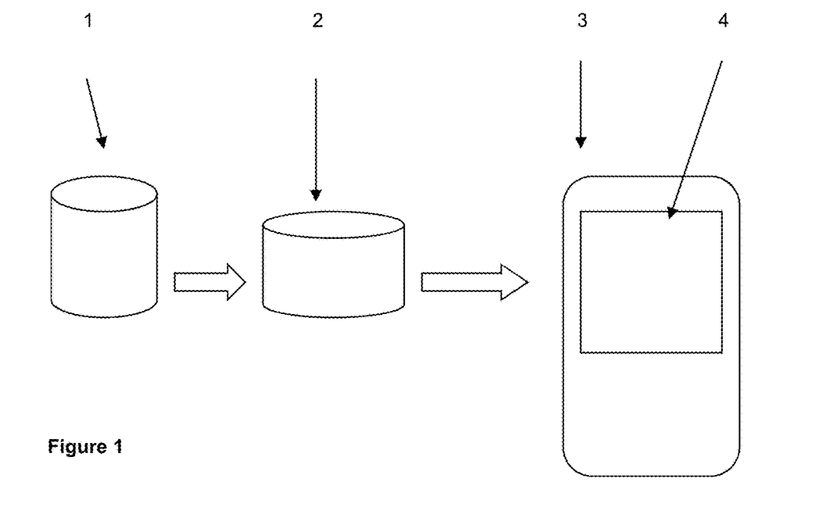
FIG. 1 schematically depicts a prior art advertising content distribution system, in which a WAP browser on a mobile telephone views WAP content that includes advertising supplied by a content server.
Figure 2:
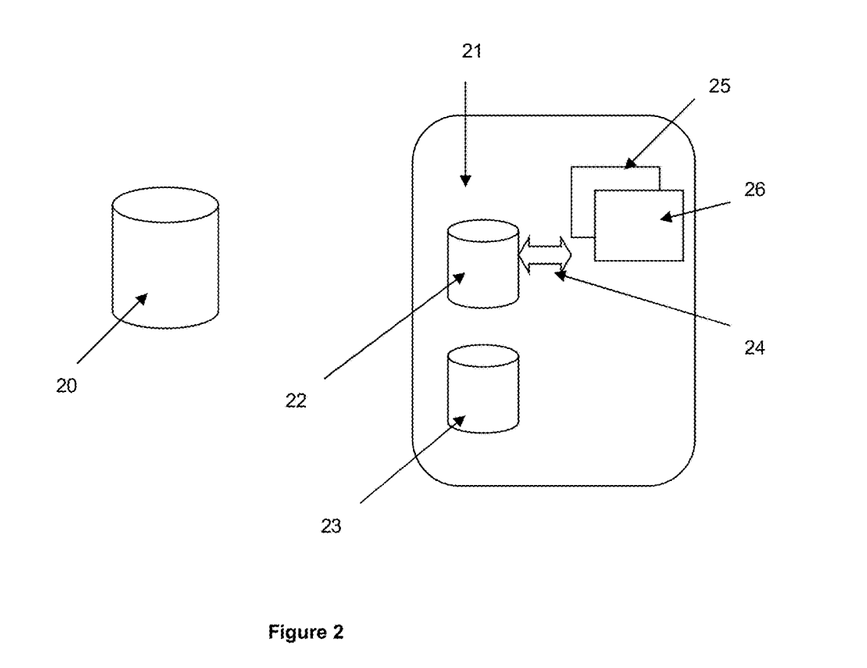
FIG. 2 schematically depicts an implementation of an 'Advertising Middleware System' that may be used in an implementation of the present invention. In the 'Advertising Middleware System', a mobile telephone replicates advertising content from a remote server. The mobile telephone locally stores content in a cache memory and makes appropriate advertising content available for display in various applications running on the telephone. The Advertising Middleware System is described in more detail in Appendix 1.

This difference over the prior art is illustrated in FIGS. 1 and 2. FIG. 1 shows a typical prior art advertising content distribution system, in which a content server 1, that hosts advertising content, feeds content to mobile WAP sites 2. Mobile WAP sites 2 incorporate the advertising content into their own content. A mobile telephone 3 includes a browser application 4 that enables a user to view WAP sites 2 over a wireless link.

An implementation of the Advertising Middleware System is shown schematically in FIG. 2. A content server 20 stores content. A wireless connection links the content server with a mobile telephone 21. A client application (advertising engine) 22 loaded onto the mobile telephone retrieves content from the server 20 and places it into local content store 23 (which is typically the main memory of the device not necessarily a dedicated memory). It uses a data replication system (not shown) to obtain the content. The client application 22 exposes an open API 24, enabling any end-user application 25, 26, running on the device to call for or be pushed appropriate content from the client application 22, which in turn retrieves appropriate content from the local store 23 and provides it to the application for display.

Further optional implementation features include:
the client application is a plug-in.
the client application is a DLL (dynamic linker library).
the client application exposes an interface that enables any application running on the telephone that can interact with that interface to retrieve or to be pushed content/adverts etc. using the client application.
the content/adverts etc. are of a type defined by a particular application on the telephone, or that meet criteria defined by or associated with that application; the application defines the media type and the required screen dimensions for the advertising content and the criteria include one or more of the gender, age, location, interests, telephone model of a user.
the client application records the number of times content/adverts etc. has been viewed.
the client application records the length of time content/adverts etc. have been viewed.
the client application records how often a user clicks on content/adverts etc. to interact with them or obtain further information or a service relating to them.
the client application records one or more of the gender, age, location, interests, telephone model of a user that has viewed content/advert.
the client application transmits its records to a remote server.
the client application determines for how long content/adverts etc. should be continuously displayed or changed for new content/adverts etc.
the telephone downloads new content/adverts etc. from a remote server as an automatic, background process that does not interrupt normal use of the telephone.
the automatic, background process is a data replication or synchronisation process between the telephone and the remote server.
the type of content/adverts etc. downloaded to a particular telephone are of a type appropriate to one or more applications on that telephone and to the particular telephone model.

if a diary application is being used, then the type of content/adverts etc. defined by the diary application for retrieval using the client application are adverts for events (e.g. cinema, sports, TV).
if a personal finance/e-wallet application is being used, then the type of Content/adverts etc. defined by the personal finance/wallet application for retrieval using the client application are adverts from banks/financial services.
if a music download or play application is being used, then the type of Content/adverts etc. defined by the music application for retrieval using the client application include adverts for new CDs, tracks, ringtones, videos and concerts etc.
if a games related application is being used, then the type of content/adverts etc. defined by the games related application for retrieval using the client application are adverts for new games.
More generally, the advertising content automatically displayed is selected to be context appropriate, given the live/in-use application.

The next section describes an implementation of the Advertising Middleware System in which mobile advertising middleware is used to deliver advertisements to any application on a mobile device, and record the number of times these advertisements are viewed. The middleware includes a mobile client application (the advertising engine), a central server, and the communications protocol that is used to communicate between the two.

Advertising Middleware System: the Mobile Advertising Engine

This technology provides a means to replicate any data between a mobile telephone and a central server. The mobile advertising middleware uses this replication technology to deliver advertisements (which may include images, video, sounds and text), to the advertising engine on the mobile device.

The advertising engine works as a plug-in that can be used by any application on the telephone to manage the download and presentation of adverts. The engine also records the number of times advertisements are viewed/played/clicked on the mobile device by the end user, and sends these statistics back to the central server.

The advertising engine is a DLL that any other application can use to retrieve advertisements of the type they wish to display. This allows application developers to generate revenue by displaying advertisements within their applications.

Advertising Middleware System: Use Case

The following example illustrates how the advertising engine may be used by an application on a mobile device. A low budget developer distributes a game application as shareware. Instead of relying on donations, the developer can use the advertising engine to generate revenues. The game connects to the advertising engine to retrieve and display advertisements at various points during the game (see FIG. 3).

Figure 3:
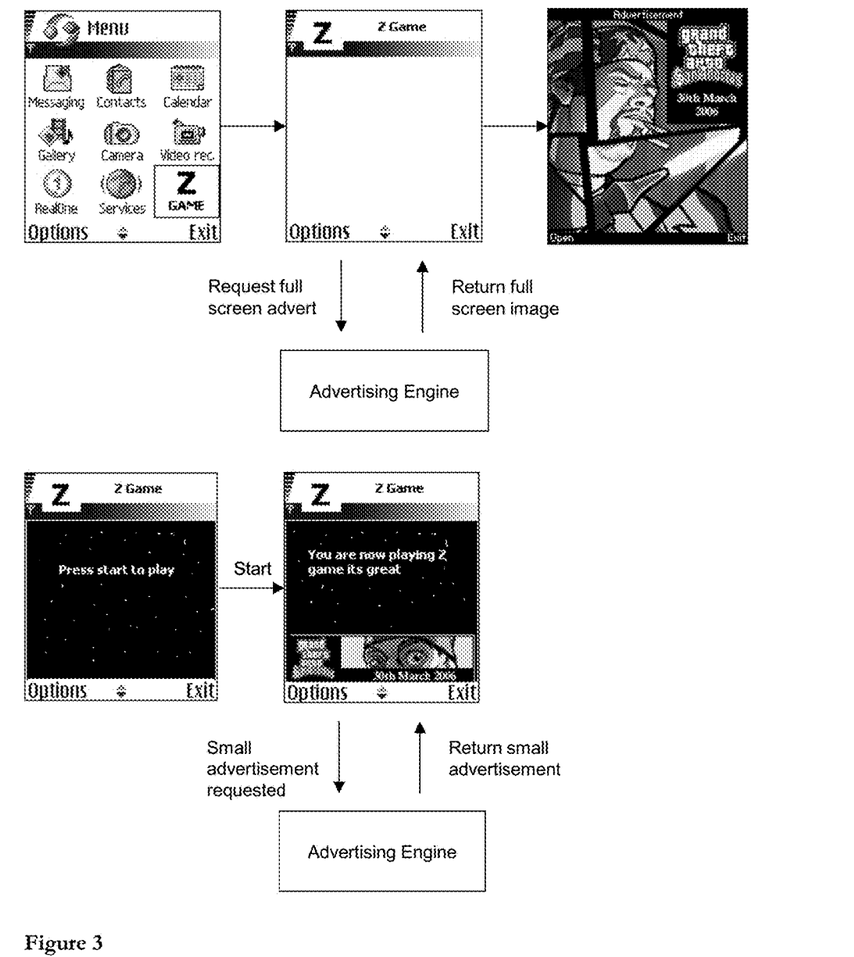
FIG. 3 includes screenshots from a mobile telephone that implements the 'Advertising Middleware System'.

For example, the user starts the game, which immediately retrieves a full screen advert from the advertising engine and displays it on the screen for a few seconds.

At the beginning of play, the game retrieves a smaller advert from the advertising engine and displays it unobtrusively at the bottom of the screen. The advert displayed may be swapped for a different advert at appropriate points (e.g. every minute, or at level changes).

The mobile advertising middleware serves relevant advertisements according to the target audience for the game, and collects information at a central server about the number of times each advertisement is viewed. Revenue is collected by the service provider operating the mobile advertising middleware, and an agreed share is given to the game developer.

The above scenario is a very simple example of how the mobile advertising middleware could be used. In practice, commercial applications could use the advertising engine to provide a much richer advertising experience on a mobile telephone—for example using video and audio.

Advertising Middleware System: Technical Outline

The mobile Advertising Middleware System Provides the Following Functions

Initial Seeding

The advertising engine is initially seeded with a number of generic adverts to enable the engine to be used without a significant download of data to the telephone. Typically this would include a number of small images.

Advert Updates

The advertising engine uses replication technology to periodically download new advertisements to the mobile device in the background, without interrupting normal use of the telephone. The replication technology is described in WO 2004/057828, the contents of which are incorporated by reference. The advertising engine can be configured to connect and download a new set of adverts at specified time intervals, or after a certain proportion of the current adverts have been viewed.

Advert Retrieval

The advertising engine presents an application programming interface (API) on the device, allowing any local application to retrieve an advert. The mechanism supports simple or complex advert retrieval:

For the simple retrieval option, the application requests an advert of a particular media type (image, video etc.) and specifies the screen dimensions available for display. The advertising engine randomly selects and returns an advert that fits the criteria provided.

The complex retrieval system allows the application to specify more detailed criteria for the type of advert required. For example, an application that requires a user to register or sign up before use could pass the information gathered (such as gender, age, location, interests etc.) to the advertising engine, which would filter the adverts available for an appropriate selection.

Advert Usage

All adverts that are requested from the advertising engine are recorded and details sent back to the central server when a connection is made. The details stored may consist of the number of views of each advert, the number of times they were requested, and the user details from the more complex advert retrieval system requests.

Reporting to Partners

Usage statistics are recorded by the central server and made available to advertising partners via a web site. The web site also enables partners to submit and manage the adverts they want to offer for display on mobile devices via the mobile advertising middleware.

The invention claimed is:

1. A device for enabling a user to interact with content received from a remote server, comprising:
a mobile device including a display, a cache memory, and a processor configurable to run one or more end-user applications;
a client content-engine application installed onto the mobile device receiving the content over a wireless network, the client content-engine application managing the download and storage of the content onto the cache memory of the mobile device, the client content-engine application then automatically providing a specific item of the stored content to at least one of said one or more end-user applications so that the at least one of said one or more end-user applications automatically displays the specific item of content on the display of mobile device, without the user explicitly requesting the display of that specific item of content, and wherein said specific item of the stored content is associated with said at least one of said one or more end-user applications and is selected by said client content-engine application for delivery based on parameters of said at least one of said one or more end-user applications;
wherein:
in response to the user selecting or highlighting the displayed specific item of content, listing on the mobile device multiple options that, if individually selected, each initiate an associated action that corresponds to a particular way of responding to or interacting with the specific item of content;
said client content-engine application exposes a generic API accessible to said one or more end-user applications;
if the user highlights or selects a specific item of content, then that item will change appearance and the listed multiple options will alter to include menu items for applicable actions; and
some or all of said content can have an expiry date after which it will not be displayed.

2. The device of claim 1 in which the content stored on the cache memory is dynamically updateable over the air.

3. The device of claim 1 in which the specific items of content are targeted for a user based on metadata in those specific items of content.

4. The device of claim 3 in which the metadata relates to one or more of: advertising categories; language of the user; location of the user; demographic of the user; usage patterns of the user; feeds subscribed to by the user.

5. The device of claim 1 in which the content is displayed in a photo-sharing or upload application.

6. The device of claim 1 in which each associated action is one of the following: the display of a full-screen advertisement for a configurable time period, or until the user clicks; the playing of an audio file; the playing of a video file in full-screen mode; the opening of a URL link in the phone's browser; the requesting of more information via email; the sending of an email from a remote server to a pre-defined address; the dialing of a phone number; the sending of a pre-defined Web link to a friend via email from a remote server; the subscribing to a feed; the adding of a web site to the web sites used by the application that displays the content; the navigation to a specific screen in the menu system of the mobile device; the sending of an SMS or MMS message.

7. The device of claim 1 in which the actions stored on the mobile device can be added to with new actions with an over the air update process.

8. The device of claim 1 in which the content includes one or more items of advertisement content, and each specific item of advertisement content has metadata associated with each available action.

9. The device of claim 8 in which the metadata associated with each associated action includes one or more of: a full screen advertisement file attachment; an audio file attachment (with optional graphic to display while the advertisement is playing); a video file attachment; a phone number and message text for click-to-call; URL links (for display in device browser, or for sending to a friend via SMS/email); a pre-formatted SMS message and recipient phone number; pre-defined message templates and email addresses to which a server should send pre-formatted or user-generated messages; an associated subscription to a feed; a default time interval after which a highlighted Banner advertisement will display a potential action; menu text labels for each action item; a specified order for the actions in the menu.

10. The device of claim 1 in which each specific item of content will have targeting metadata, which enables the content that is displayed to be targeted to a specific user.

11. The device of claim 1 including the step of recording when users view advertisements or initiate actions, and replicating this information to a remote server for analysis.

12. The device of claim 11 in which, for each action initiated, one or more of the following information is recorded:
   type of action initiated;
   date and time when the action was initiated;
   Whether initiating an action was user-generated or involuntary;
   Context.

13. A computer program product for enabling a user to interact with content received from a remote server, the computer program product comprising a computer-readable non-transitory storage medium having computer-readable program code embodied in the computer-readable non-transitory storage medium, said computer-readable program code configuring:
   a mobile device including a display, a cache memory, and a processor configurable to run one or more end-user applications;
   a client content-engine application installed onto the mobile device to receive the content over a wireless network, the client content-engine application managing the download and storage of the content onto the cache memory of the mobile device, the client content-engine application then automatically providing a specific item of the stored content to at least one of said one or more end-user applications so that the at least one of said one or more end-user applications automatically displays the specific item of content on the display of the mobile device, without the user explicitly requesting the display of that specific item of content, and wherein said specific item of the stored content is associated with said at least one of said one or more end-user applications and is selected by said client content-engine application for delivery based on parameters of said at least one of said one or more end-user applications;
   wherein:
   in response to the user selecting or highlighting the displayed specific item of content, lists on the mobile device multiple options that, if individually selected, each initiate an associated action that corresponds to a particular way of responding to or interacting with the specific item of content;
   said client content-engine application exposes a generic API accessible to said one or more end-user applications;
   if the user highlights or selects a specific item of content, then that item will change appearance and the listed multiple options will alter to include menu items for applicable actions; and
   some or all of said content can have an expiry date after which it will not be displayed.

14. The computer program product of claim 13 in which the content stored on the cache memory is dynamically updateable over the air.

15. The computer program product of claim 13 in which the specific items of content are targeted for a user based on metadata in those specific items of content.

16. The computer program product of claim 15 in which the metadata relates to one or more of: advertising categories; language of the user; location of the user; demographic of the user; usage patterns of the user; feeds subscribed to by the user.

17. The computer program product of claim 13 in which the content is displayed in a photo-sharing or upload application.

18. The computer program product of claim 13 in which each associated action is one of the following: the display of a full-screen advertisement for a configurable time period, or until the user clicks; the playing of an audio file; the playing of a video file in full-screen mode; the opening of a URL link in the phone's browser; the requesting of more information via email; the sending of an email from a remote server to a pre-defined address; the dialing of a phone number; the sending of a pre-defined Web link to a friend via email from a remote server; the subscribing to a feed; the adding of a web site to the web sites used by the application that displays the content; the navigation to a specific screen in the menu system of the mobile device; the sending of an SMS or MMS message.

19. The computer program product of claim 13 in which the associated actions stored on the mobile device can be added to with new actions with an over the air update process.

20. The computer program product of claim 13 in which the content includes one or more items of advertisement content, and each specific item of advertisement content has metadata associated with each available action.

21. The computer program product of claim 20 in which the metadata associated with each associated action includes one or more of: a full screen advertisement file attachment; an audio file attachment (with optional graphic to display while the advertisement is playing); a video file attachment; a phone number and message text for click-to-call; URL links (for display in device browser, or for sending to a friend via SMS/email); a pre-formatted SMS message and recipient phone number; pre-defined message templates and email addresses to which a server should send pre-formatted or user-generated messages; an associated subscription to a feed; a default time interval after which a highlighted Banner advertisement will display a potential action; menu text labels for each action item; a specified order for the actions in the menu.

22. The computer program product of claim 13 in which each specific item of content will have targeting metadata, which enables the content that is displayed to be targeted to a specific user.

23. The computer program product of claim 13, wherein computer-readable program code configures the mobile device to record when users view advertisements or initiate actions, and replicates this information to a remote server for analysis.

24. The computer program product of claim 23 in which, for each action initiated, one or more of the following information is recorded:
   type of action initiated;
   date and time when the action was initiated;
   Whether initiating an action was user-generated or involuntary;
   Context.

* * * * *